United States Patent [19]

Staudenrausch

[11] Patent Number: 5,102,314
[45] Date of Patent: Apr. 7, 1992

[54] VANE PUMP FOR CONVEYING PASTY MASSES, IN PARTICULAR SAUSAGE MEAT

[75] Inventor: Georg Staudenrausch, Biberach an der Riss, Fed. Rep. of Germany

[73] Assignee: Albert Handtmann Maschinenfabrik GmbH & Co., KG, Fed. Rep. of Germany

[21] Appl. No.: 600,849

[22] Filed: Oct. 22, 1990

[30] Foreign Application Priority Data

Dec. 14, 1989 [DE] Fed. Rep. of Germany ... 8914705[U]

[51] Int. Cl.$^5$ ............... F04C 2/344; F04C 13/00; F04C 15/00
[52] U.S. Cl. ..................... 418/15; 418/127; 418/255; 418/260; 452/41
[58] Field of Search ............. 418/15, 127, 128, 255, 418/257, 258, 260; 452/41; 417/900

[56] References Cited

U.S. PATENT DOCUMENTS

| | | | |
|---|---|---|---|
| 254,044 | 2/1882 | Potter | 418/127 |
| 475,367 | 5/1892 | Wassermann | 452/41 |
| 1,393,698 | 10/1921 | Piatt | 418/127 |
| 1,871,525 | 8/1932 | Hudson | 418/255 |
| 2,514,521 | 7/1950 | Shaff | 418/258 |
| 3,543,330 | 12/1970 | Muller | 452/41 |

*Primary Examiner*—John J. Vrablik
*Attorney, Agent, or Firm*—Finnegan, Henderson, Farabow, Garrett & Dunner

[57] ABSTRACT

A vane pump for conveying pasty masses, in particular sausage meat, comprising a pump housing and a rotor, which is eccentrically arranged within the pump housing and which is caused to rotate. Radially continuous vanes are supported on the rotor in a radially displaceable manner that define angular conveying cells with the wall of the pump housing and cooperate with the wall to produce a sealing effect. An adjustable pressure piece is mounted in a radial recess in the wall of the pump housing, the pressure piece replacing the contour of the wall of the pump housing with its surface which faces the vanes. Adjustment of the pressure piece adjusts the pressure applied to the vanes in a radial direction in the pressure area of the pump prior to its outlet.

6 Claims, 4 Drawing Sheets

VANE PUMP FOR CONVEYING PASTY MASSES, IN PARTICULAR SAUSAGE MEAT

BACKGROUND OF THE INVENTION

The present invention relates to a vane pump for conveying pasty masses, in particular sausage meat, having a pump housing and a rotor, which is eccentrically arranged within said pump housing and which is caused to rotate, as well as vanes, which are supported in said rotor in a radially displaceable manner and which define conveying cells with the wall of the pump housing and cooperate with said wall so as to produce a sealing effect. The vanes have pressure applied thereto in the radial direction in the pressure area of the pump prior to its outlet.

Such vanes pumps used for conveying sausage meat can serve e.g. as a dosing unit in a supplementary portioning machine or as a unit for subdividing the material being conveyed or as a filling pump, but they can also serve as a component part of a vacuum filler.

Such a vane pump is known from German patent specification 16 53 843. Here, a cam is arranged in the inner area of the rotor such that it cannot be rotated, but radially displaced, the vanes resting on said cam with their portions projecting into the rotor. Said cam is adapted to be pressed outwards with the aid of a radial slot guiding device and an inclined surface. In the pressure area of the pump, said cam applies pressure to the rear parts of the vanes sweeping past, and this has the effect that the front edges of said vanes are pressed against the wall of the pump housing in this area so as to provide an improved sealing effect.

This known vane pump has a very complicated structural design requiring a large number of components. Moreover, a very exact radial adjustment and readjustment of the vanes is not possible.

The present invention is based on the task of further developing a vane pump of this type in such a way that an improved efficiency can be achieved with the aid of simple structural means.

SUMMARY OF THE INVENTION

In order to solve this task, the present invention provides in such a vane pump the features that a pressure piece is supported in a radial recess of the wall of the pump housing such that it is adapted to be radially adjusted, said pressure piece replacing the contour of the wall of the pump housing with its surface which faces the vanes, and that, in addition, the vanes are constructed as radially continuous vanes.

A simple structural design of the vane pump is obtained, since all the contours which are essential with regard to its function are positioned in a single part, viz. in the pump housing. The adjustment and the readjustment of the vanes can be effected from outside, and said adjustment and readjustment operations can be performed with very high accuracy.

Another advantage is that only two friction surfaces are defined in view of the continuous vanes. Moreover, the continuous vanes are supported much more stably so that any tendency to tilt is eliminated.

When the vane pump is provided as a component part of a vacuum filler, a vacuum aperture can be arranged in the wall of the housing of the pump in such a way that an adjustment of the vanes becomes effective in the pressure area as well as in the vacuum region.

BRIEF DESCRIPTION OF THE DRAWINGS

An embodiment of the invention is illustrated in the following drawings and will be explained in greater detail below. Of the drawings.

DETAILED DESCRIPTION OF THE INVENTION

Figure 1:
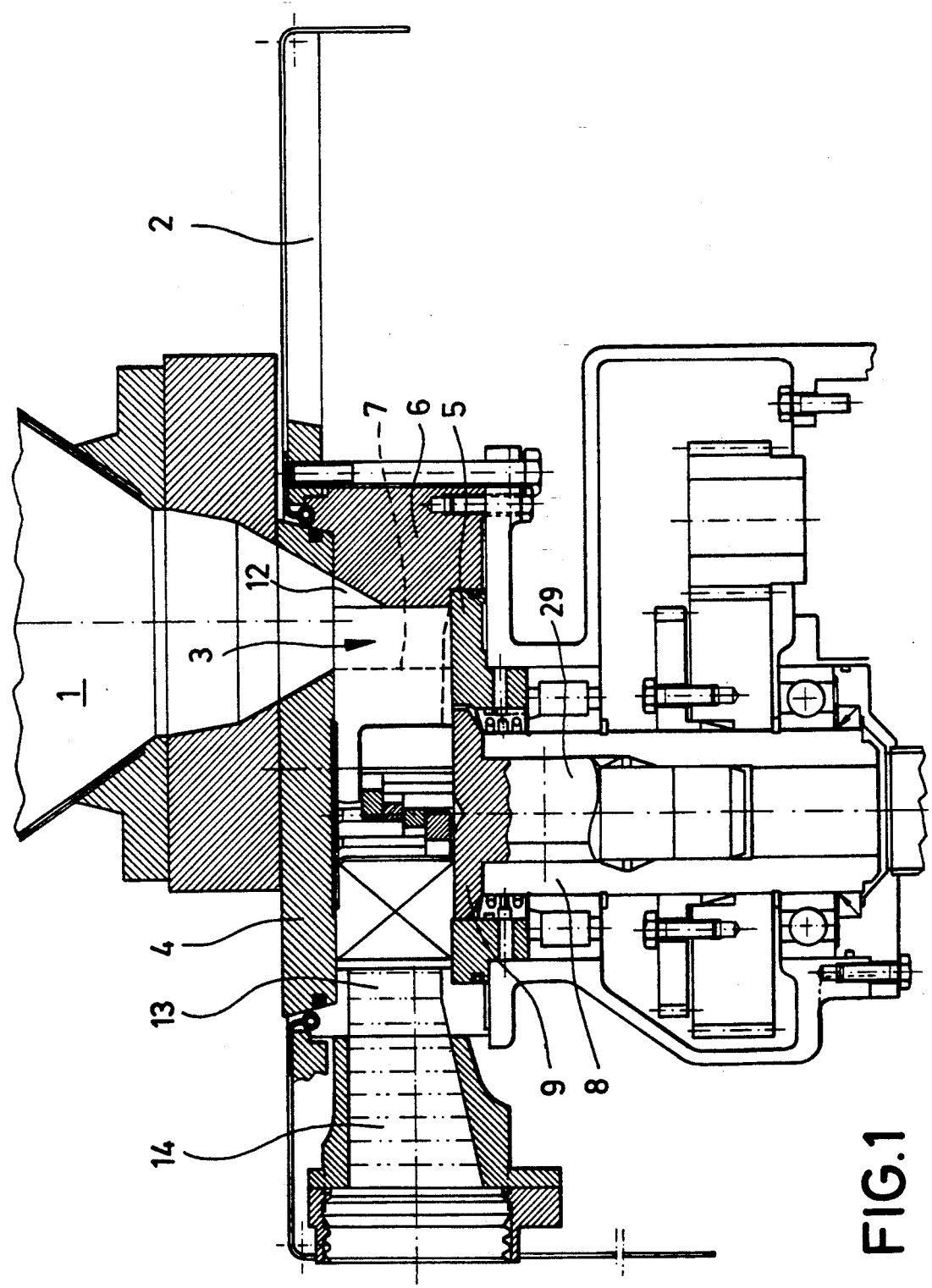
FIG. 1 is a partial vertical section through a vacuum filler including the vane pump of the invention.

In the drawings, the vane pump is shown as a component part of a vacuum filler.

As shown in FIG. 1, the vacuum filler has a feeding hopper 1, arranged on the upper side of a machine housing 2.

The vane pump, which, as a whole, is provided with reference numeral 3, is arranged within the machine housing 2 below the feeding hopper 1.

The interior of the vane pump 3 is delimited by a cover plate 4 as well as by a base plate 5 and a housing wall 6. In the interior of the vane pump 3, a rotor 7 is eccentrically supported, said rotor 7 being caused to rotate by means of a polygonal drive sleeve 8, which is supported in the machine housing 2 and which is positively connected to the drive shaft 29 of said rotor. The drive shaft 29 is provided with a plate 9, which, as a component of the rotor 7, defines a part of the base of the pump housing.

The rotor 7 has an annular configuration and radial slots therein in which vanes 10a to 10e are supported in a radially displaceable manner.

While rotating, the ends of each vane slide along the inner wall 11 of the pump housing wall 6. In so doing, the vanes define, together with the inner wall 11 of the pump housing wall 6 and with the cover plate 4 and the base plate 5, conveying cells, which, while rotating, change in volume. These changes in volume are determined by the contour of the inner wall 11.

The housing wall 6 has provided therein a sausage meat inlet 12 and a sausage meat outlet 13.

The sausage meat inlet 12 is connected to the outlet of the feeding hopper 1. The sausage meat outlet 13 leads to a discharge pipe 14, which may be followed e.g. by a twist-off device (not shown).

Figure 2:
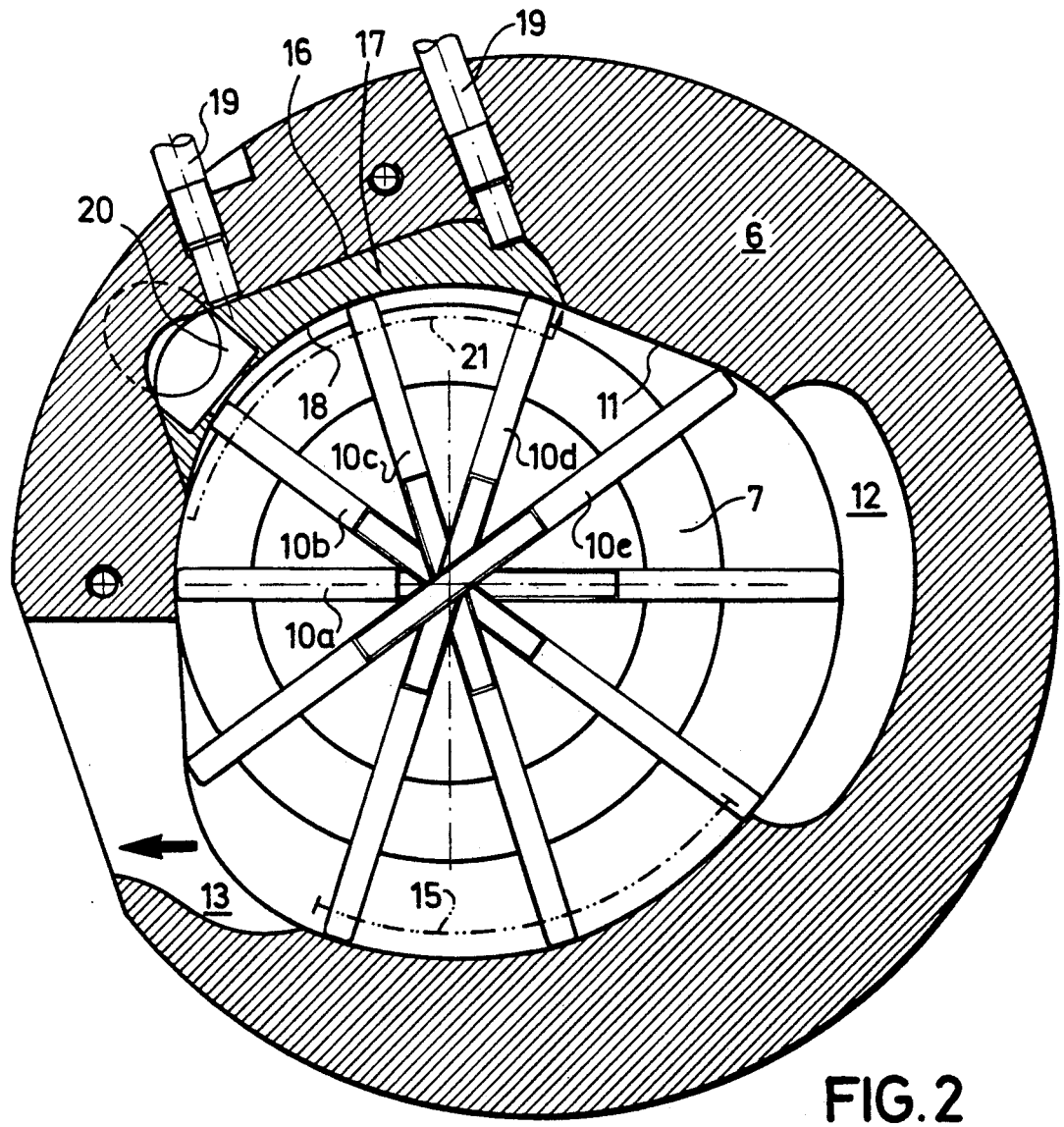
FIG. 2 is a radial sectional view through the vane pump.

As shown in FIG. 2, the conveying cells have their maximum volume in the area of the sausage meat inlet 12.

In the direction of rotation, of the rotor, as indicated by the arrow in FIG. 2, the sausage meat inlet 12 is followed by a pressure area, outlined by dot-dash line 15 in which the volume of the conveying cells decreases.

The pressure area 15 is followed—again in the direction of rotation of the rotor—by the sausage meat outlet 13. In accordance with the invention housing wall 6 has provided therein a recess 16, which is located opposite the pressure area 15 and in which a pressure piece or block 17 is arranged. On its surface facing the vanes 10a to 10e, the pressure piece 17 has a contour 18, which replaces the contour of the inner wall 11 of the pump housing wall 6 in such a way that the contour 18 merges with the contour of the inner wall of the pump housing wall 6.

The housing wall 6 has provided therein two pressure screws 19 whose front ends apply pressure to the pressure piece 17 thus adjusting said pressure piece to bring it into contact with the vanes 10a to 10e.

Figure 5:
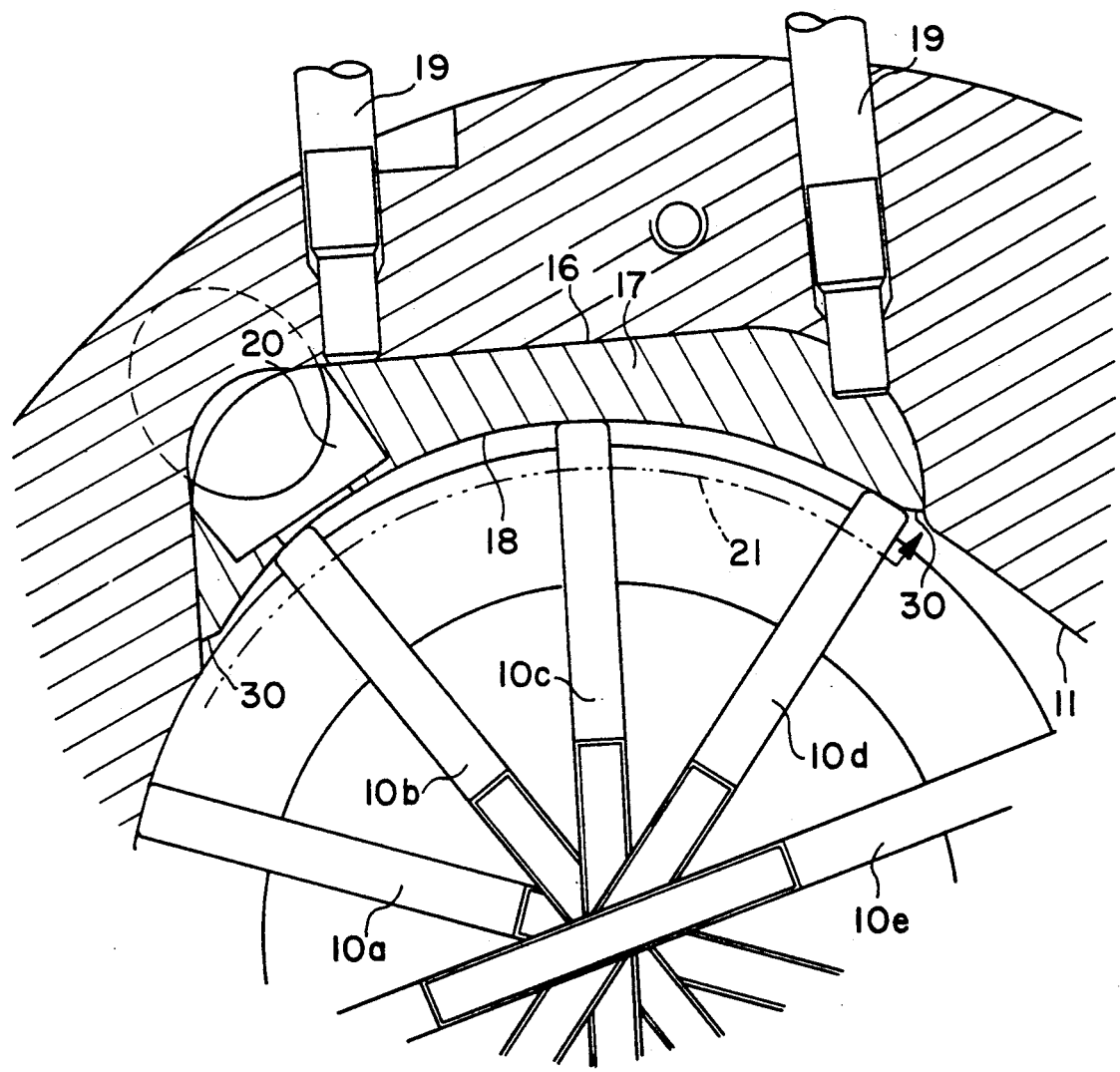
FIG. 5 is an enlarged view of the pressure adjusting piece of the pump.

The pressure piece 17 may be provided with flat chamfers 30 (see FIG. 5) at its ends following the contour of the inner wall 11 of the pump housing wall 6 so that practically no steps are formed when the pressure piece is reset, such resetting being carried out only within the range of a fraction of a millimeter.

In the area of the pressure piece 17, a vacuum aperture 20 is provided, which communicates with a vacuum source for removing air from the incoming sausage meat. This has the effect that a vacuum region outlined by dot-and-dash line 21, is formed in the area of the pressure piece 17. In the case of the embodiment shown in the drawing, the pressure piece 17 extends over an area of approximately three vanes 10b, 10c and 10d.

The contour 18 of the pressure piece 17 is such that the distance from the radially opposite contour of the inner wall 11 corresponds to the length of a vane, when the pressure piece 17 is precisely adjusted, either for the purpose of carrying out the first setting operation in the case of a new pump or for the purpose of compensating for a certain amount of wear in the case of a used pump.

The setting or resetting of the pressure piece 17, which can easily be carried out from outside, simultaneously has the effect that the respective vane is adjusted such that it is also brought into contact with the opposite contour, i.e. in the pressure area 15, since each of the continuous vanes 10a to 10e is supported in the rotor in a radially displaceable manner. Thus the sealing effect of the vanes can be improved not only in the pressure area 15 but also in the vacuum region 21 so that, on the one hand, the volumetric efficiency of the pump is increased, the accuracy to weight being thus improved and the volumetric delivery being maintained constant, whereas, on the other hand, there is practically no backward flow of the sausage meat mass in the vacuum region so that evacuation of said mass takes place in the best possible manner.

Figure 3:
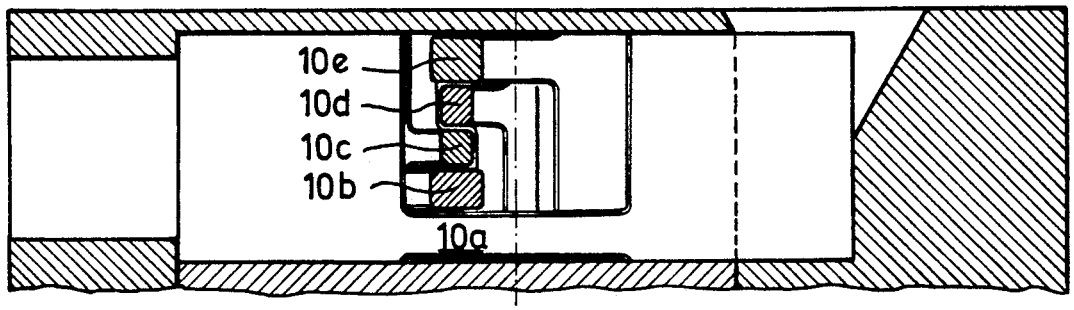
FIG. 3 is an axial sectional view thereof.
Figure 4:
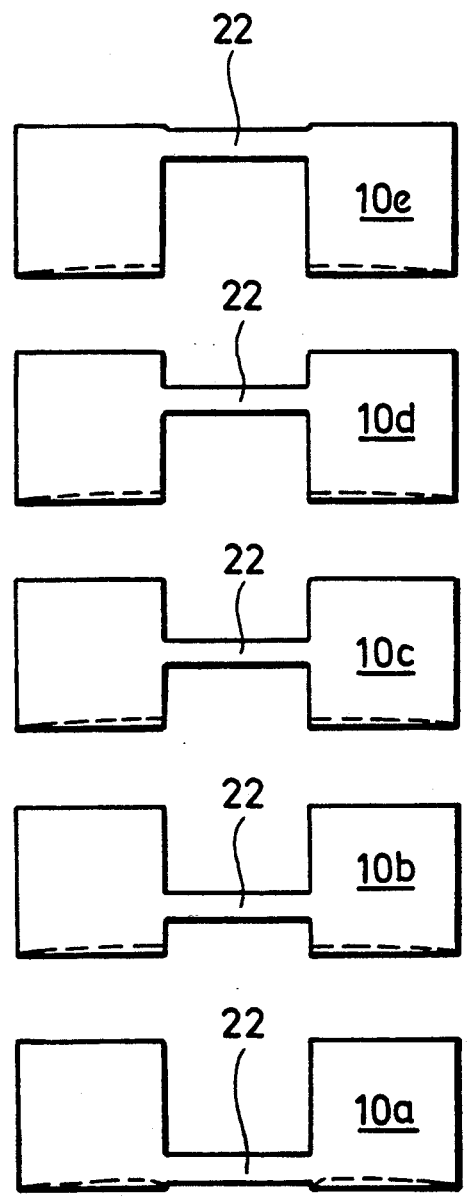
FIG. 4 is an exploded view of the vanes of the pump.

So that the continuous vanes 10a to 10e do not obstruct one another at the center of the rotor, their superimposed central areas are notched, as best shown in FIGS. 3 and 4.

The shape of the notched portions of the individual vanes 10a to 10e is schematically shown in FIG. 4. In the case of the vanes 10a and 10e, the notched portion is of such a nature that a U-shape is defined, said U-shape being open at the top in the case of the vane 10a and open at the bottom in the case of the vane 10e.

In the case of the vanes 10b to 10d, the respective webs 22 are vertically displaced to a certain extent so that, when assembled, the vanes are superimposed whereby they support one another in the vertical direction.

The respective vanes 10a to 10e need not be constructed as one-piece vanes. It is only necessary to take care that the two active ends of each vane are interconnected in such a way that any pressure applied by means of the pressure piece 17 to one active end is transmitted to the other active end as well.

I claim:

1. A vane pump for conveying pasty masses comprising a pump housing having an inner wall, a rotor eccentrically mounted within said pump housing about an axis of rotation and having radial slots, means for rotating said rotor, a plurality of radially continuous integral vanes mounted in said slots for radial displacement, said vanes extending from one end on one side of the rotor through its axis to an end on the other side thereof and defining, with each other and the inner wall of the pump housing, a plurality of angular conveying cells, both ends of said vanes cooperating with said inner wall in a sealing manner, said pump housing having an inlet and an outlet angularly offset therefrom in the direction of rotation of the rotor with a pressure area being located between said inlet and outlet for compacting the mass in said cells, a radial recess in said inner wall between said outlet and inlet in the direction of rotation of the rotor and substantially opposite said pressure area, a pressure adjusting block slidably located in said recess, the outer surface of which forms a continuation of and has a contour compatible with said inner wall of the pump housing and means for radially adjusting said block toward and away from the axis of the rotor, whereby adjustment of said block adjusts the sealing pressure of the ends of said radially displaceable vanes with the inner wall of the pump housing in said pressure area of the pump.

2. The vane pump of claim 1, wherein the pressure block has flat chamfers at its ends adjacent the inner wall of the pump housing.

3. The vane pump of claim 1 or 2, wherein the outer surface of the pressure block extends circumferentially a distance of at least two vanes.

4. The vane pump of claim 1 or 2, wherein the outer surface of the pressure block extends circumferentially a distance sufficient to simultaneously adjust the sealing pressure of all of the vanes then located in the pressure area of the pump.

5. The vane pump of claim 1, wherein the radially continuous vanes are compatibly notched where they cross one another at the axis of the rotor so that each one is independently radially displaceable.

6. The vane pump of claim 1, including a vacuum aperture in said wall communicating with a source of vacuum to draw off air from inside the pump, said aperture being located after said pump outlet and adjacent said pressure block.

* * * * *